US010336215B2

(12) United States Patent
Sowinski et al.

(10) Patent No.: US 10,336,215 B2
(45) Date of Patent: Jul. 2, 2019

(54) MOVABLE VEHICLE SEAT WITH INTEGRATED OCCUPANT RESTRAINT SYSTEM

(71) Applicants: Stephen J Sowinski, Rochester Hills, MI (US); Robert C Ramirez, White Lake, MI (US); Mark T Moushegian, San Diego, CA (US); Daniel Kaczmarek, Livonia, MI (US)

(72) Inventors: Stephen J Sowinski, Rochester Hills, MI (US); Robert C Ramirez, White Lake, MI (US); Mark T Moushegian, San Diego, CA (US); Daniel Kaczmarek, Livonia, MI (US)

(73) Assignee: FCA US LLC, Auburn Hills, MI (US)

( * ) Notice: Subject to any disclaimer, the term of this patent is extended or adjusted under 35 U.S.C. 154(b) by 79 days.

(21) Appl. No.: 15/597,864

(22) Filed: May 17, 2017

(65) Prior Publication Data

US 2017/0341532 A1 Nov. 30, 2017

Related U.S. Application Data

(60) Provisional application No. 62/341,792, filed on May 26, 2016.

(51) Int. Cl.
*B60N 2/07* (2006.01)
*B60N 2/30* (2006.01)
*B60R 22/26* (2006.01)

(52) U.S. Cl.
CPC ......... *B60N 2/0732* (2013.01); *B60N 2/3047* (2013.01); *B60R 22/26* (2013.01)

(58) Field of Classification Search
CPC ...... B60N 2/0732; B60N 2/3047; B60R 22/26
USPC ...................................... 297/340, 344.1, 483
See application file for complete search history.

(56) References Cited

U.S. PATENT DOCUMENTS

| | | | |
|---|---|---|---|
| 4,964,608 A | 10/1990 | Rogala et al. | |
| 5,411,319 A * | 5/1995 | Kuiri | B60R 22/26 297/483 X |
| 5,782,537 A * | 7/1998 | Leistra | B60N 2/0232 297/483 |
| 5,785,292 A | 7/1998 | Muraishi et al. | |
| 6,406,092 B1 | 6/2002 | Cordes et al. | |
| 7,229,117 B2 | 6/2007 | Okuda et al. | |
| 7,325,851 B2 * | 2/2008 | Ito | B60N 2/067 297/344.1 X |
| 7,644,952 B2 | 1/2010 | Holtz et al. | |
| 8,708,299 B2 | 4/2014 | Kitamura et al. | |

(Continued)

FOREIGN PATENT DOCUMENTS

GB 2523817 A 9/2015

*Primary Examiner* — Anthony D Barfield
(74) *Attorney, Agent, or Firm* — Ralph E. Smith (57) ABSTRACT

A seat includes a seat bottom, a seat back, a seat mounting structure configured to support the seat bottom and the seat back, the seat mounting structure configured to slidably couple to the rail assembly, and an occupant restraint system including a seat belt coupled to a retractor assembly. The retractor assembly is configured to slidably couple to the rail assembly such that the retractor assembly moves along the rail assembly as the seat mounting structure is moved along the rail assembly, the occupant restraint system configured to transfer load to the rail assembly disposed in the vehicle floor.

14 Claims, 9 Drawing Sheets (56) References Cited

U.S. PATENT DOCUMENTS

2014/0167466 A1\* 6/2014 Line ................. B60N 2/3065
  297/340
2015/0137571 A1\* 5/2015 Koike ................. B60N 2/643
  297/340 X \* cited by examiner

MOVABLE VEHICLE SEAT WITH INTEGRATED OCCUPANT RESTRAINT SYSTEM

CROSS-REFERENCE TO RELATED APPLICATIONS

This application claims benefit of U.S. Provisional Application Ser. No. 62/341,792 filed on May 26, 2016. The disclosure of the above application is incorporated herein by reference in its entirety.

FIELD

The present application relates generally to passenger seating for a vehicle and, more particularly, to a movable vehicle seat with an integrated and movable occupant restraint system.

BACKGROUND

Current vehicle regulations require that automobiles be equipped with an occupant protection system as a safety feature during an impact event or rapid vehicle deceleration. One typical occupant protection system is a seat belt which physically restrains the occupant during such an impact event. In order to accommodate various sizes and shapes of occupants, seats of motor vehicles are provided with a fore-and-aft adjustment mechanism to enable the occupant to position themselves a desired distance from the vehicle instrument panel and/or brake and accelerator pedals. In known systems, anchorages for the seat belts are fastened to the vehicle floor at the outboard sides of the seat. When the seat position is adjusted, the seat belt becomes tightened or loosened around the occupant, requiring it to be readjusted. Mounting the seat belt anchorages to a movable portion of the seat avoids this problem, however, such designs impose cost and weight penalties since the adjuster must be designed to withstand significant mechanical loads. Accordingly, while such systems work well for their intended purpose, it is desirable to provide an improved seating system.

SUMMARY

According to one example aspect of the invention, a vehicle seat configured to slidably couple to a rail assembly disposed in a floor of the vehicle is provided. The seat includes, in one exemplary implementation, a seat bottom, a seat back, a seat mounting structure configured to support the seat bottom and the seat back, the seat mounting structure configured to slidably couple to the rail assembly, and an occupant restraint system including a seat belt coupled to a retractor assembly. The retractor assembly is configured to slidably couple to the rail assembly such that the retractor assembly moves along the rail assembly as the seat mounting structure is moved along the rail assembly, the occupant restraint system configured to transfer load to the rail assembly disposed in the vehicle floor.

In addition to the foregoing, the described seat may include one or more of the following features: wherein the seat mounting structure is configured to couple to a first portion of the rail assembly, and the occupant restraint system is configured to couple to a second portion of the rail assembly independent of the first portion such that the seat mounting structure transfers a first load to the first portion of the rail assembly and the occupant restraint system transfers a second load to the second portion of the rail assembly; wherein the seat back includes a central frame member disposed at least partially within the seat back, the central frame member defining a central guide cavity to guide and conceal the seat belt in a substantially vertical direction between an upper end and a lower end of the seat back; wherein the seat back further includes a seat belt shoulder guide coupled to the upper end of the seat back, the seat belt shoulder guide configured to guide the seat belt across a chest of an occupant and to the central guide cavity; and wherein the central frame member includes an opening to allow the seat belt to extend from the seat belt shoulder guide into the central guide cavity.

According to one example aspect of the invention, a movable seat system for a vehicle is provided. The system includes, in an exemplary implementation, a rail assembly configured to couple to a floor of the vehicle and generally extending in a fore-aft direction of an interior of the vehicle, at least one sled slidably coupled to the rail assembly such that sled slides along the rail assembly in the fore-aft direction, and a seat having a seat bottom, a seat back, and a seat mounting structure. The seat mounting structure supports the seat bottom and is configured to removably couple to the at least one sled. The seat is configured to be selectively positioned in a desired location along the length of the rail assembly by sliding the seat coupled to the sled along the rail assembly.

In addition to the foregoing, the described movable seat system may include one or more of the following features: wherein the rail assembly comprises a middle rail assembly disposed between a driver side rail assembly and a passenger side rail assembly, each of the middle, driver side, and passenger side rail assemblies including at least one of the sleds slidably coupled thereto; wherein the seat bottom is rotatably coupled to the seat back such that the seat bottom is movable between a deployed position and a stowed position, wherein in the deployed position an occupant is able to sit on the seat bottom, and in the stowed position the seat bottom is rotated upwardly toward the seat back to provide more room within the vehicle; wherein the rail assembly includes an inner rail disposed between opposed outer rails, wherein the sled includes opposed grooves configured to receive the opposed outer rails such that a load is transferred from the seat to the opposed outer rails; and wherein the seat further includes a restraint system slidably coupled to the inner rail such that a load is transferred from the restraint system to the inner rail.

In addition to the foregoing, the described movable seat system may include one or more of the following features: wherein the seat mounting structure includes a rearward central support coupled to the seat back, and a forward central support configured to support the seat bottom; wherein the rearward central support includes spaced apart legs having upper ends coupled to the seat back, and lower ends configured to couple to the at least one sled; wherein the rail assembly includes a plurality of sleds slidably coupled to the rail assembly, each sled of the plurality sleds configured to removably couple to the seat; wherein the at least one sled comprises three sleds slidably coupled to the rail assembly, and wherein the seat comprises three seats, each seat of the three seats couple to one sled of the three sleds; wherein the seat includes an occupant restraint system and a central frame member, wherein the occupant restraint system includes a seat belt coupled to a retractor assembly, wherein the central frame member is disposed at least partially within the seat back and defines a central guide cavity to guide and conceal the seat belt in a substantially vertical direction between an upper end and a lower end of the seat back; wherein the seat back includes a seat belt shoulder guide coupled to the upper end of the seat back, the seat belt shoulder guide configured to guide the seat belt across a chest of an occupant and to the central guide cavity; and wherein the retractor assembly is slidably coupled to the rail assembly such that the occupant restraint system is movable as the seat slides along the rail assembly.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings references therein, are merely exemplary in nature intended for purposes of illustration only and are not intended to limit the scope of the present disclosure, its application or uses. Thus, variations that do not depart from the gist of the present disclosure are intended to be within the scope of the present disclosure

DETAILED DESCRIPTION

Figure 1:
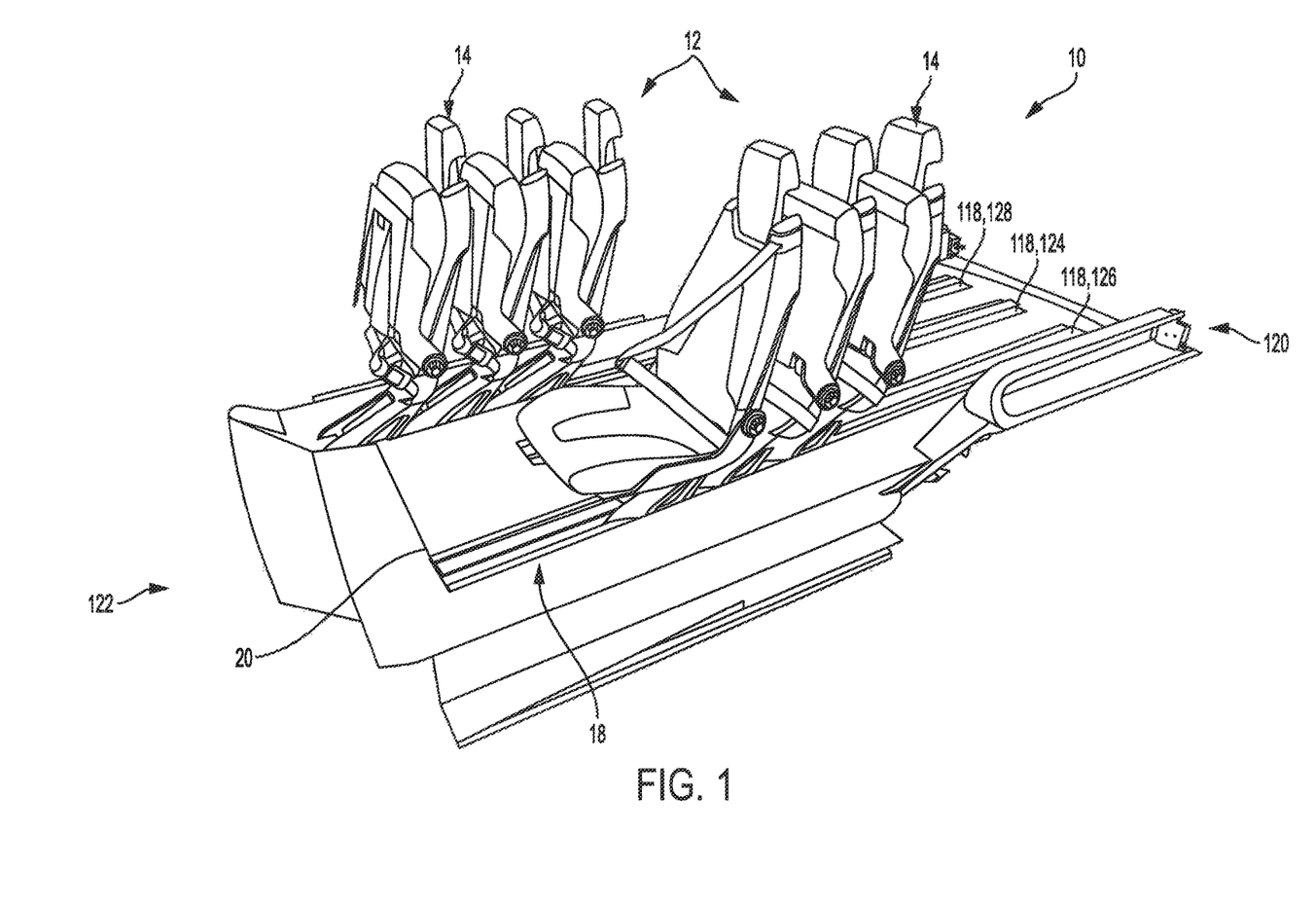
FIG. 1 is a perspective view of an exemplary vehicle having a movable seat system with integral occupant restraint system in accordance with the principles of the present disclosure.
Figure 2:
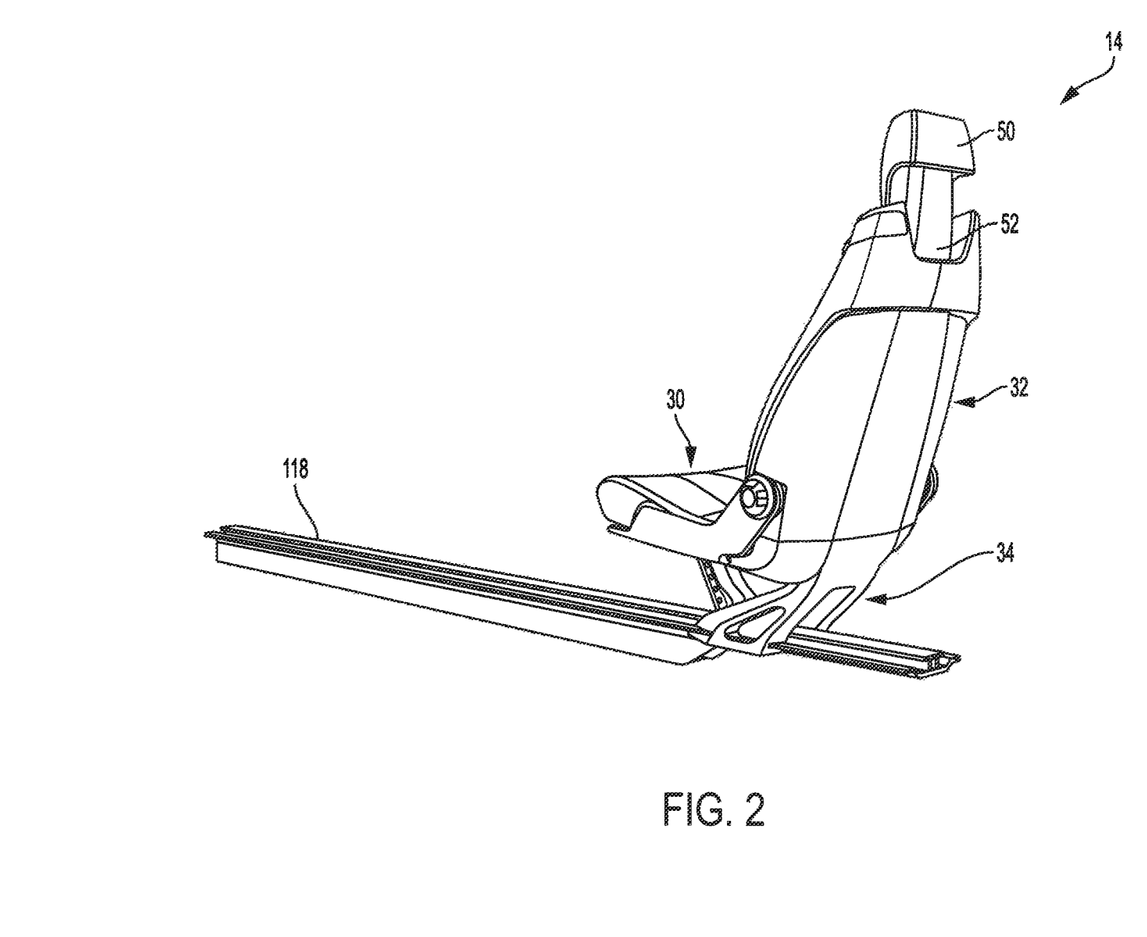
FIG. 2 is a rear perspective view of an example seat that may be used with the vehicle seat system shown in FIG. 1 in accordance with the principles of the present disclosure.
Figure 3:
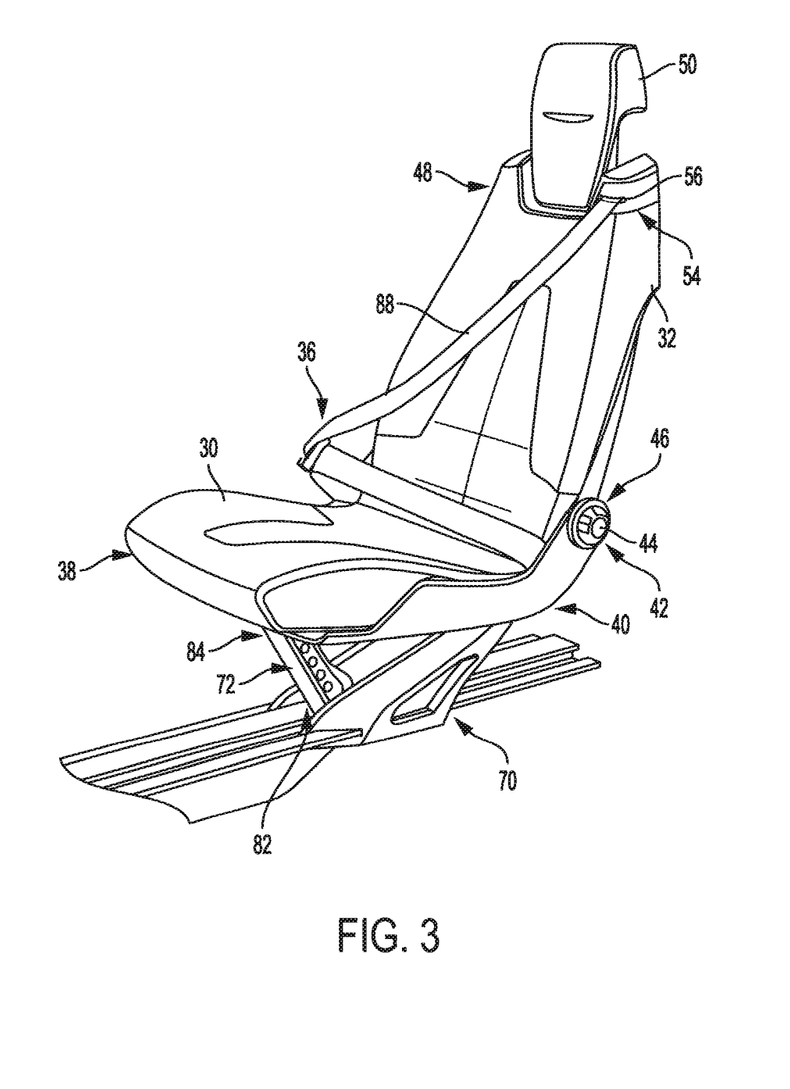
FIG. 3 is a front perspective view of the example seat shown in FIG. 2 in accordance with the principles of the present disclosure.

With reference to FIG. 1, a vehicle 10 having an exemplary movable vehicle seat system 12 according to various aspects of the present disclosure is illustrated. Movable seat system 12 generally includes a plurality of vehicle seats 14 movably coupled to a track or rail system 18 that is integrated with a floor 20 of the vehicle 10. With further reference to FIGS. 2 and 3, in the example implementation, each vehicle seat 14 generally includes a seat bottom 30, a seat back 32, a seat mounting structure 34, and an occupant restraint system 36.

Seat bottom 30 includes a distal or forward end 38 and a proximal or rearward end 40, which is rotatably coupled to seat back 32 at a pivot joint 42. Seat bottom 30 is configured to rotate about a pivot point 44 between a design or seating position (see FIG. 3) and a stowed position (leftmost seats in FIG. 1) where seat bottom 30 is rotated upward toward seat back 32.

Figure 6:
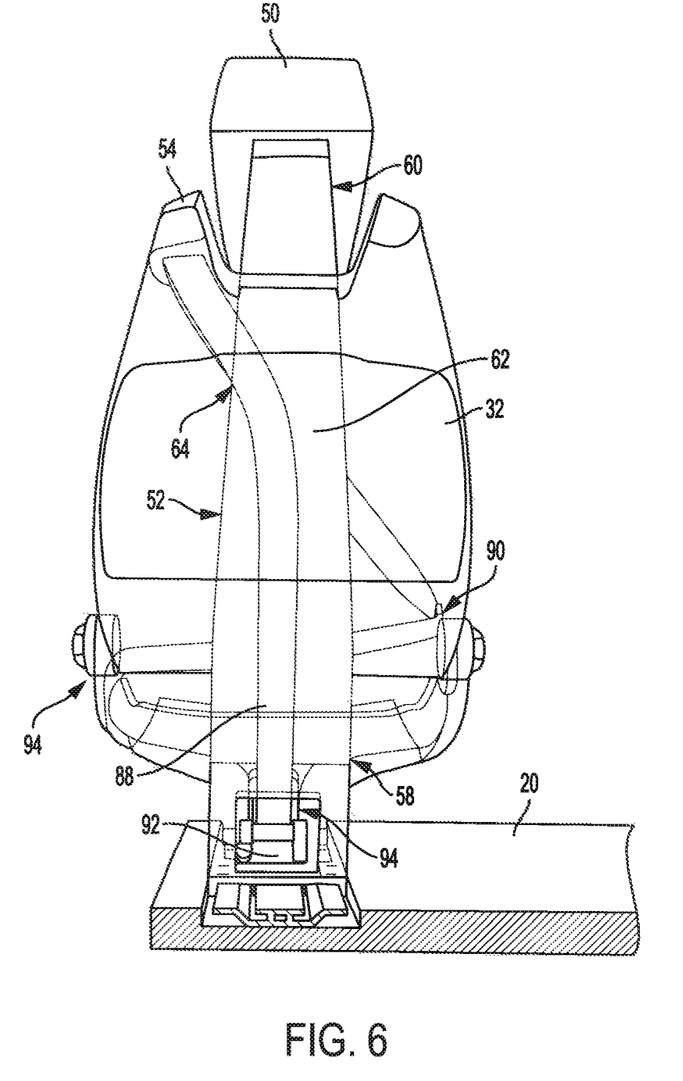
FIG. 6 is a partial transparent rear view of the example seat shown in FIG. 2 in accordance with the principles of the present disclosure.

Seat back 32 generally includes a lower end 46, an upper end 48, a head rest 50, and an internal central frame member 52 (see FIG. 6). Seat back lower end 46 is positioned proximate seat bottom 30 and includes pivot joint 42. Seat back upper end 48 includes a seat belt shoulder guide 54 formed therein that includes a slot 56 (FIG. 3) configured to receive a seat belt 88 of the occupant restraint system 36. Seat belt shoulder guide 54 is configured to position a portion of the seat belt such that seat belt 88 generally extends over an occupant's shoulder and across his/her chest toward the opposite side hip. Headrest 50 is coupled to seat back upper end 48 and/or central frame member 52.

In one example implementation, as shown in FIG. 6, central frame member 52 is disposed at least partially within seat back 32 and includes a lower end 58, an upper end 60, and a central guide cavity 62. Lower end 58 is coupled to or formed integrally with the seat mounting structure 34 such that central frame member 52 extends upwardly therefrom. Upper end 60 can extend above seat back upper end 48 and receive headrest 50. In one example, central frame member 52 defines an opening 64 configured to receive a portion of seat belt 88 extending from seat belt shoulder guide 54, such that seat belt 88 is directed into the central guide cavity 62. In the example implementation, the central guide cavity 62 guides seat belt 88 vertically downwardly along seat back 32 in a central location thereof, as shown for example in FIG. 6. Moreover, central frame member 52 conceals a portion of seat belt 88 as it extends through the seat back 32.

Figure 4:
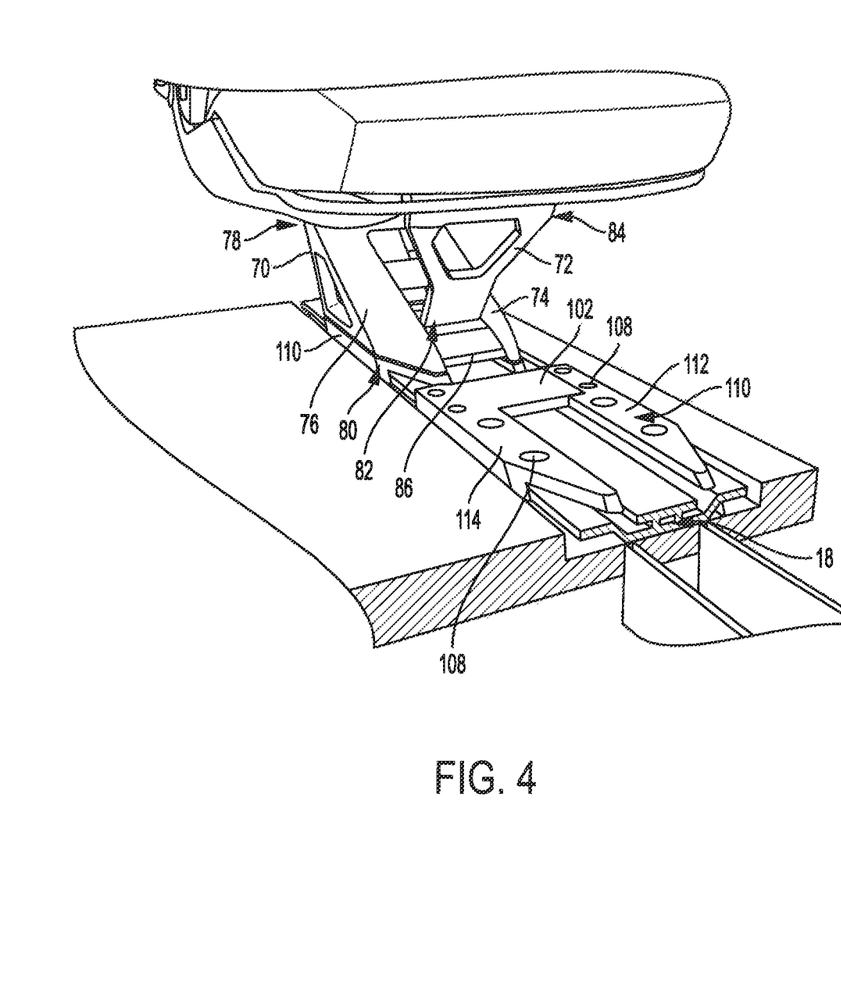
FIG. 4 is a partial front perspective view of the example seat shown in FIG. 2 in accordance with the principles of the present disclosure.
Figure 5:
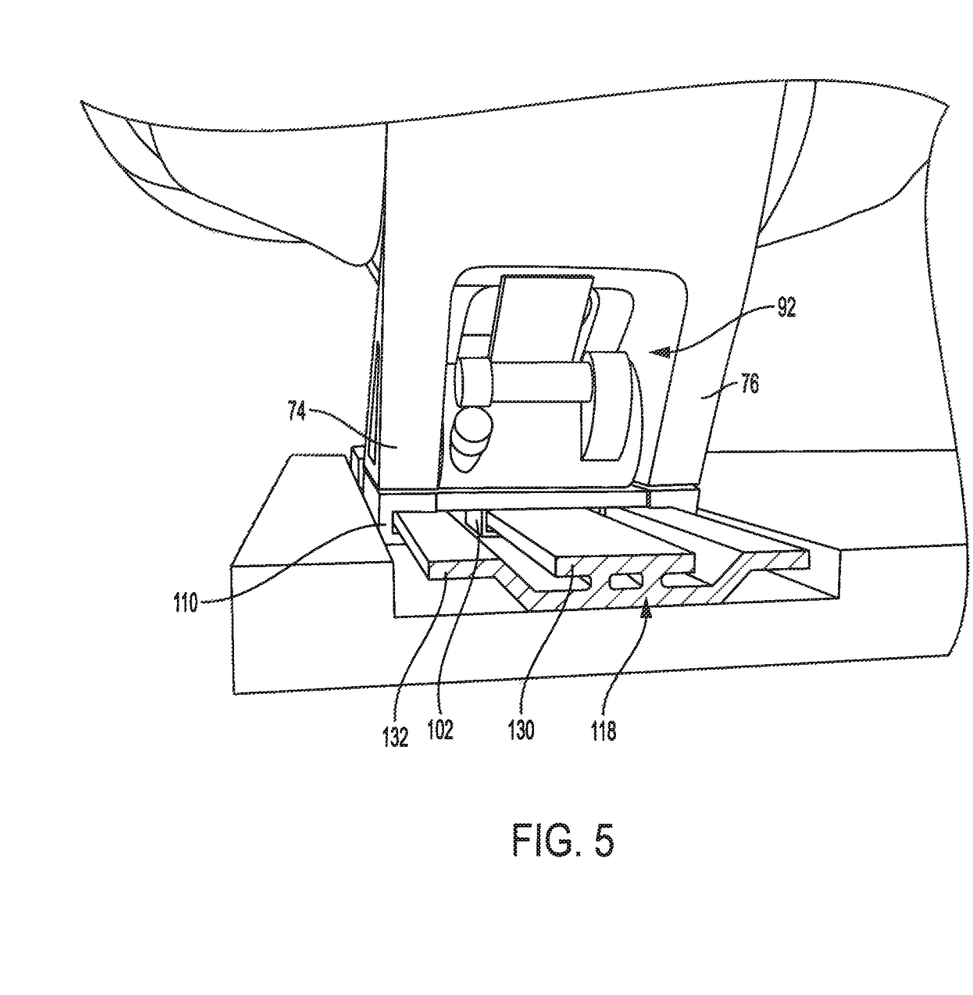
FIG. 5 is a partial rear perspective view of the example seat shown in FIG. 2 in accordance with the principles of the present disclosure.

With reference to FIGS. 2-5 and 8, seat mounting structure 34 generally includes a rearward central support 70 and a forward central support 72. Rearward central support 70 includes spaced apart left and right legs 74 and 76 (as seated in and facing the front of the vehicle) each having an upper end 78 and a lower end 80. The upper ends 78 are coupled to or integrally formed with central frame member lower end 58 and, as shown in FIG. 4, lower ends 80 are configured to couple to a sled 110, which is slidably coupled to rail system 18, as described herein in more detail. More specifically, the left leg lower end 80 is coupled to a left portion 112 of sled 110, and the right leg lower end 80 is coupled to a right portion 114 of sled 110.

In the illustrated example, sled 110 includes a plurality of apertures 108 configured to receive attachment features (e.g., fasteners) or locator pins (not specifically shown) for removably coupling the seat mounting structure 34 to sled 110. In this way, each vehicle seat 14 may be removably coupled to the rail system 18 such that a desired number of seats 14 may be removed from or installed into the vehicle 10. This gives a user the ability to vary the seating arrangements within vehicle 10 to provide a desired amount of cargo space or to accommodate a desired number of passengers.

Figure 7:
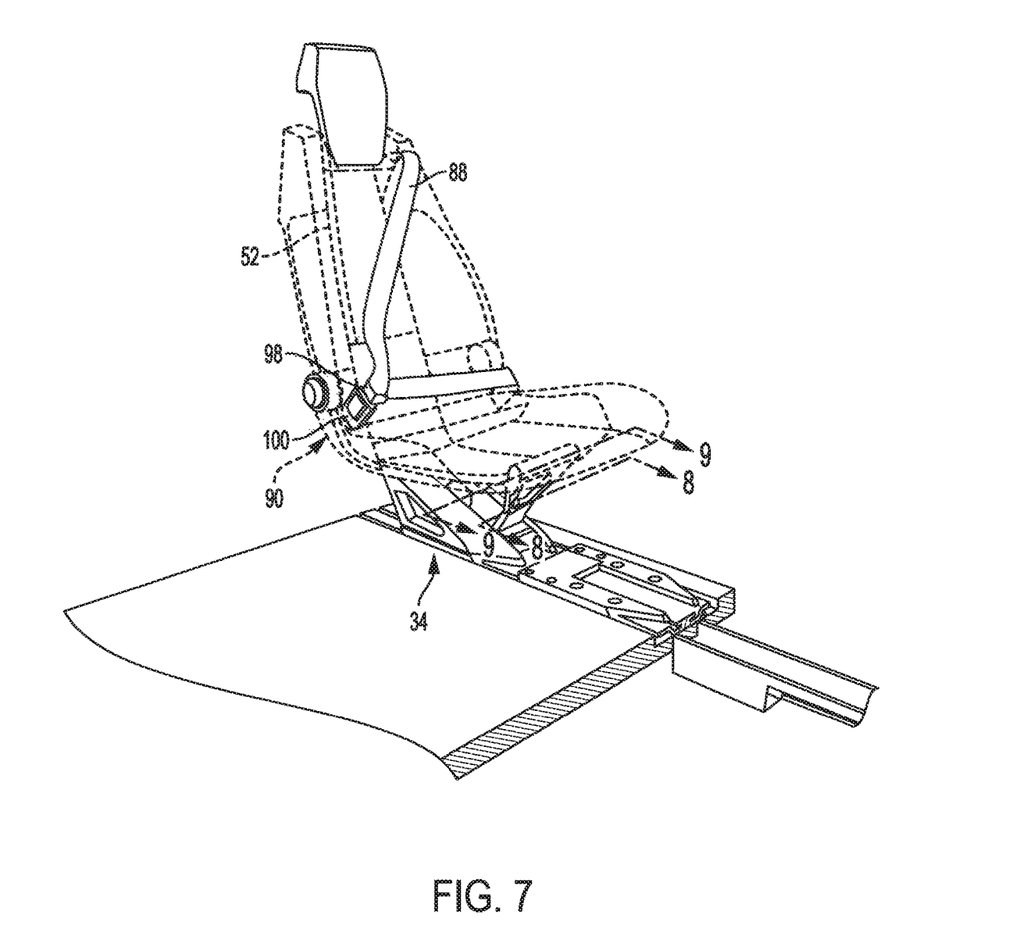
FIG. 7 is a partial transparent front perspective view of the example seat shown in FIG. 2 in accordance with the principles of the present disclosure.

Forward central support 72 generally includes a first end 82 and an opposite second end 84. First end 82 may be coupled between left and right legs 74, 76, as shown in FIGS. 2 and 4, and may abut against and/or be supported by a cross member 86 extending between left and right legs 74, 76. As shown in FIG. 7, second end 84 is coupled to seat bottom 30 to provide support to an object resting thereon. In one example implementation, first end 82 is rotatably coupled between legs 74, 76 by a pin (not specifically shown) extending through first end 82 and coupled to legs 74, 76, and second end 84 is rotatably coupled to seat bottom 30 by a second pin (not specifically shown), thereby allowing angular adjustment of forward central support 72 and thus angular adjustment of seat bottom 30. In other implementations, a mechanical adjustment system (not specifically shown) is associated with forward central support 72 to provide automatic adjustment of seat bottom 30 and/or seat back 32.

Figure 9:
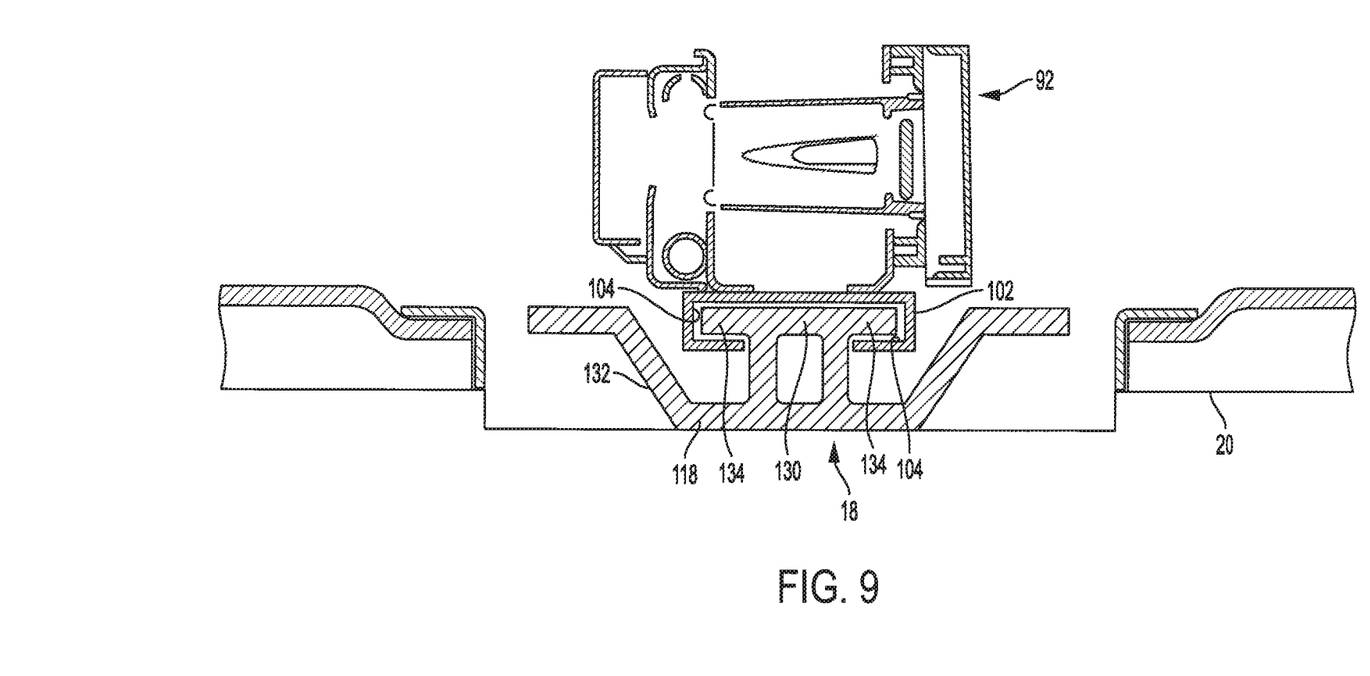
FIG. 9 is a cross-sectional view of a portion of the example seat shown in FIG. 7 and taken along line 9-9, in accordance with the principles of the present disclosure.

With reference to FIGS. 6, 7, and 9, the occupant restraint system 36 will be described in more detail. The occupant restraint system 36 generally includes a seat belt 88, a latch or buckle system 90, and a belt tensioner or retractor assembly 92. The seat belt 88 includes a first end 94 secured to one side of the vehicle seat 14 generally adjacent one of the occupant's hips, and a second end 96 operably coupled to the belt retractor assembly 92. Buckle system 90 generally includes a tongue 98 (FIG. 7) configured to releasably couple to a buckle 100 that is secured to the other side of the vehicle seat 14 generally opposite the seat belt first end 94. As such, the seat belt 88 extends across the occupant's lap, through tongue 98, shoulder guide 54, and central frame member 52. The seat belt second end 96 extends into and is secured within the belt retractor assembly 92.

In the example implementation, the belt retractor assembly 92 is positioned between left and right support legs 74, 76 and is coupled to a bracket 102, which is slidably coupled to rail system 18. However, belt retractor assembly 92 may not be coupled to seat mounting structure 34 and instead may be separately coupled to the rail system 18, as described herein in more detail. Function of the belt retractor assembly 92 is well known in the art. For example, the belt retractor assembly 92 is configured to take up slack in the seat belt 88 and to prevent slack during an acceleration or deceleration event, thereby restraining motion of the vehicle seat occupant.

With further reference to FIGS. 1, 5, 8, and 9, the rail system 18 will be described in more detail. As shown in one example implementation in FIG. 1, rail system 18 generally includes three rail assemblies 118 extending from a rear 120 of the vehicle 10 toward a front 122 of the vehicle 10. More specifically, rail system 18 includes a middle rail 124 positioned between a driver side rail 126 and a passenger side rail 128. Each rail assembly 118 is configured to removably receive one or more vehicle seats 14. In the example implementation, seats 14 are configured to selectively slide along rail assemblies 118 and lock into a desired position between the vehicle rear 120 and the vehicle front 122. As shown in FIG. 1, all vehicle seats 14 (e.g., excluding the driver's seat) may be moved to the stowed position and arranged at the vehicle front 122. Moreover, all vehicle seats 14 (e.g., excluding the driver's seat) may be moved to the stowed position and arranged at the vehicle rear 120.

Figure 8:
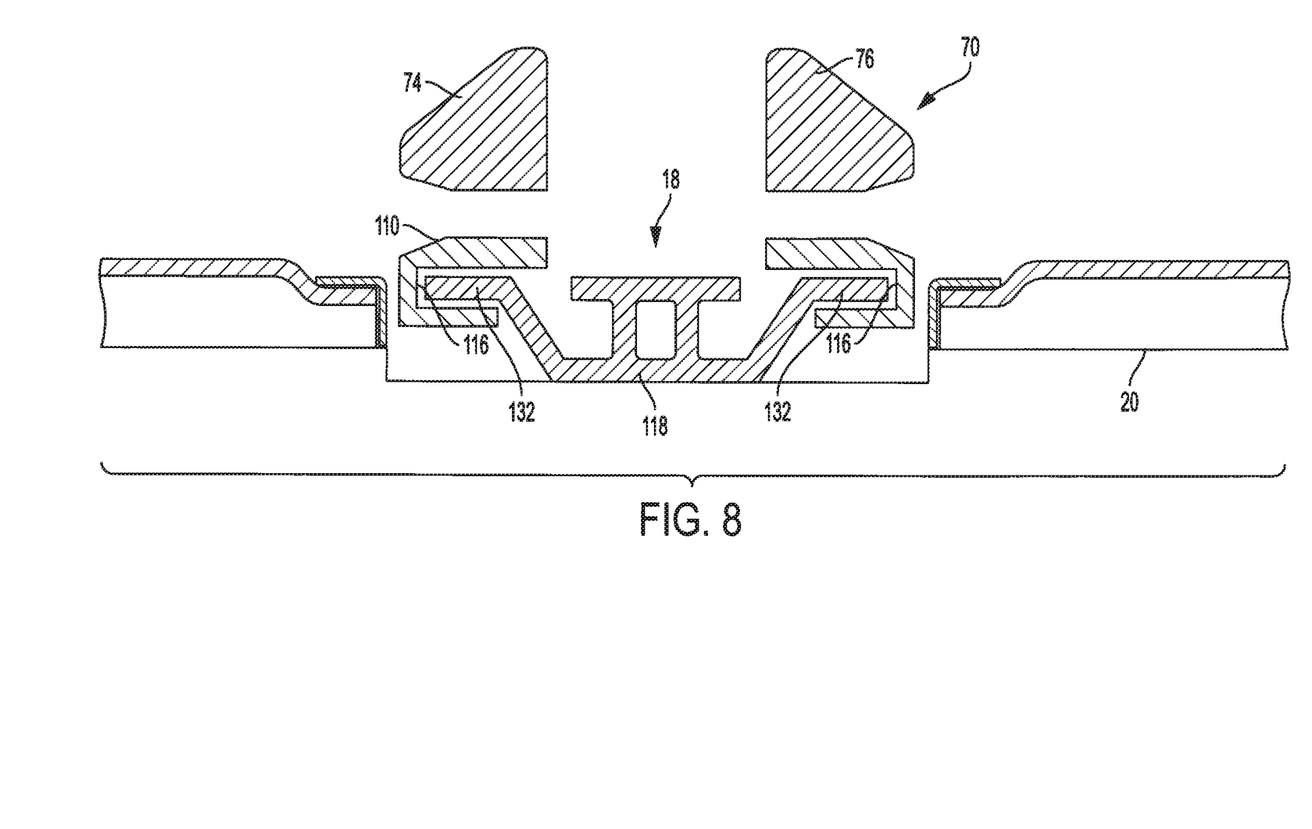
FIG. 8 is a cross-sectional view of a portion of the example seat shown in FIG. 7 and taken along line 8-8, in accordance with the principles of the present disclosure.

In the example implementation, each rail assembly 118 includes a central or inner rail 130 disposed between two outer rails 132. However, other rail configurations are envisioned that enable movable vehicle seat system 12 to function as described herein. As shown in FIG. 8, sled 110 is configured to engage and slide along the outer rails 132. In particular, sled 110 includes grooves or channels 116 configured to receive outer rails 132, to thereby attach sled 110 and thus vehicle seat 14 to the rail assembly 118. In this way, sled 110 is configured to transfer load from vehicle seat 14 to the vehicle floor 20 via the outer rails 132. As shown in FIG. 9, retractor assembly 92 is coupled to bracket 102, which is configured to engage and slide along the inner rail 130. In particular, bracket 102 includes grooves or channels 104 configured to receive flanges 134 of the inner rail 130, to thereby attach bracket 102 and thus retractor assembly 92 to the rail. In this way, bracket 102 is configured to transfer load from the occupant restraint system 36 to the vehicle floor 20 via the inner rail 130.

Described herein are systems and methods for a movable vehicle seat system. The system includes vehicle seats having a fully integrated occupant restraint system. The seats includes a mounting structure that is independently and slidably mounted to outer rails of a rail system. This allows the seats to slide along the outer rails and transfer load thereto. The occupant restraint system is independently and slidably mounted to an inner rail of the system separate from the mounting structure. This allows the occupant restraint system to slide along the inner rail and transfer load thereto. As such, the occupant restraint system can travel along the rail system with the vehicle seat while having an independent load path through the inner rail, thereby obviating the need for increased structural support on the vehicle seat necessary to handle restraint system loads. Accordingly, the movable seat with integrated occupant restraint system is capable of providing proper seat belt placement regardless of seat position within the vehicle.

It will be understood that the mixing and matching of features, elements and/or functions between various examples may be expressly contemplated herein so that one skilled in the art would appreciate from the present teachings that features, elements and/or functions of one example may be incorporated into another example as appropriate, unless described otherwise above.

What is claimed is:

1. A seat for a vehicle, the seat configured to slidably couple to a rail assembly disposed in a floor of the vehicle, the rail assembly including an inner rail disposed between opposed outer rails, the seat comprising:
   a seat bottom;
   a seat back;
   a seat mounting structure configured to support the seat bottom and the seat back, the seat mounting structure including a sled with opposed grooves configured to receive the outer rails to slidably couple to the rail assembly such that a seat load is transferred from the seat to the opposed outer rails; and
   an occupant restraint system including a seat belt coupled to a retractor assembly, wherein the retractor assembly is configured to slidably couple to the inner rail such that the retractor assembly moves along the rail assembly as the seat mounting structure is moved along the rail assembly, the occupant restraint system configured to transfer a restraint system load to the rail assembly inner rail disposed in the vehicle floor.

2. The seat of claim 1, wherein the seat back includes a central frame member disposed at least partially within the seat back, the central frame member defining a central guide cavity to guide and conceal the seat belt in a substantially vertical direction between an upper end and a lower end of the seat back.

3. The seat of claim 2, wherein the seat back further includes a seat belt shoulder guide coupled to the upper end of the seat back, the seat belt shoulder guide configured to guide the seat belt across a chest of an occupant and to the central guide cavity.

4. The seat of claim 3, wherein the central frame member includes an opening to allow the seat belt to extend from the seat belt shoulder guide into the central guide cavity.

5. A movable seat system for a vehicle, the system comprising:
   a rail assembly configured to couple to a floor of the vehicle and generally extending in a fore-aft direction of an interior of the vehicle, the rail assembly including an inner rail disposed between opposed outer rails;

a sled slidably coupled to the rail assembly such that the sled slides along the rail assembly in the fore-aft direction, wherein the sled includes opposed grooves configured to receive the opposed outer rails such that a seat load is transferred from the seat to the opposed outer rails;

a seat having a seat bottom, a seat back, and a seat mounting structure, the seat mounting structure supporting the seat bottom and configured to removably couple to the sled; and an occupant restraint system slidably coupled to the rail assembly inner rail such that a restraint system load is transferred from the restraint system to the rail assembly inner rail, wherein the seat is configured to be selectively positioned in a desired location along the length of the rail assembly by sliding the seat coupled to the sled along the rail assembly.

6. The system of claim 5, wherein the seat mounting structure includes a rearward central support coupled to the seat back, and a forward central support configured to support the seat bottom.

7. The system of claim 6, wherein the rearward central support includes spaced apart legs having upper ends coupled to the seat back, and lower ends configured to couple to the sled.

8. The system of claim 5, wherein the rail assembly includes a plurality of sleds slidably coupled to the rail assembly, each sled of the plurality sleds configured to removably couple to the seat.

9. The system of claim 8, wherein the sled comprises three sleds slidably coupled to the rail assembly, and wherein the seat comprises three seats, each seat of the three seats couple to one sled of the three sleds.

10. The system of claim 5, wherein the seat includes a central frame member, wherein the occupant restraint system includes a seat belt coupled to a retractor assembly, wherein the central frame member is disposed at least partially within the seat back and defines a central guide cavity to guide and conceal the seat belt in a substantially vertical direction between an upper end and a lower end of the seat back.

11. The system of claim 10, wherein the seat back includes a seat belt shoulder guide coupled to the upper end of the seat back, the seat belt shoulder guide configured to guide the seat belt across a chest of an occupant and to the central guide cavity.

12. The system of claim 10, wherein the retractor assembly is slidably coupled to the rail assembly such that the occupant restraint system is movable as the seat slides along the rail assembly.

13. The system of claim 5, wherein the rail assembly comprises a middle rail assembly disposed between a driver side rail assembly and a passenger side rail assembly, each of the middle, driver side, and passenger side rail assemblies including at least one of the sleds slidably coupled thereto.

14. The system of claim 5, wherein the rearward end of the seat bottom is rotatably coupled to a bottom of the seat back such that the seat bottom is movable between a deployed position and a stowed position, wherein in the deployed position an occupant is able to sit on the seat bottom, and in the stowed position the seat bottom is rotated upwardly toward the seat back to provide more room within the vehicle.

* * * * *